Jan. 7, 1964    G. ELGER ETAL    3,116,724
INTERNAL COMBUSTION ENGINES
Filed Jan. 9, 1961    2 Sheets-Sheet 1

8 Cyl.

12 Cyl.

12 Cyl.

16 Cyl.

INVENTORS
GERD ELGER and ERNST ROTH
ATTORNEYS

Jan. 7, 1964  G. ELGER ETAL  3,116,724
INTERNAL COMBUSTION ENGINES
Filed Jan. 9, 1961  2 Sheets-Sheet 2

INVENTORS
GERD ELGER and ERNST ROTH

BY *Wenderoth Lind & Ponack*

ATTORNEYS 3,116,724
INTERNAL COMBUSTION ENGINES
Gerd Elger and Ernst Roth, Winterthur, Switzerland, assignors to Schweizerische Lokomotiv- und Maschinenfabrik, Winterthur, Switzerland
Filed Jan. 9, 1961, Ser. No. 81,448
Claims priority, application Switzerland Jan. 13, 1960
6 Claims. (Cl. 123—55)

This invention relates to internal combustion engines having rows of cylinders in V-arrangement. When in engines of this type, called V-engines, the opening angle $\varphi$ between the two cylinder rows is selected so that the product of the number of cylinders and $\varphi$ is equal to 720° in four cycle engines and 360° in two cycle engines, the critical values of the ignition cycle of the two cylinder rows will become zero, which fact results into favourable dynamic conditions. For structural reasons, however, it is not always possible to maintain the optimum angle between the two rows of cylinders.

It is known, for example, when building 8- and 12-cylinder engines of the above type, to use for both engines the same opening angle $\varphi$ of 90°, in order to provide at least for one of the engines, in this case the 8-cylinder engine, normal conditions, while the 12-cylinder engine then operates with non-uniform ignition timing. This irregular ignition timing of 90° and 30° in continuous alteration has great disadvantages with respect to smooth running performance, oscillation stress and thus also to stress to which the bearings and drive unit are subjected. Such an engine possesses the combined properties of an 8- and a 24-cylinder engine as regards oscillation conditions. In addition, the above named advantage of the opening angle, namely that the critical value of the ignition cycle of each individual row becomes zero, is eliminated.

It is an object of the present invention to provide an internal combustion engine of the above type in which the mentioned drawbacks are avoided and in which a regular ignition order is assured. According to the invention the opening angle $\varphi$ between the two rows of cylinders of the V-engine deviates by an angle of correction $\varphi_k$ from the required theoretical value for maintaining the regular ignition order, in accordance with a method known per se (Lancia principle), and the crank pins for two opposite pistons are axially subdivided in two pin portions which are angularly displaced through said angle of correction. For two or more engine models having different numbers of cylinders, the opening angle is modified and brought from the theoretical value to a common average value $\varphi_m$.

Examples of the invention are illustrated in the accompanying drawings, in which FIGURES 1 and 2 are diagrammatic illustrations of an 8-cylinder and a 12-cylinder four cycle V-engine, respectively;

FIGURES 8a, 8b, and 9a, 9b show modifications in plan view and elevation, respectively, of the throw of a crankshaft.

Figure 5:
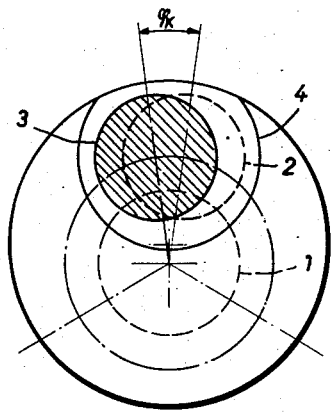
FIGURES 5, 6 and 7 show a cross-section, a plan view and a view in elevation, respectively, of a crankshaft throw.
Figure 6:
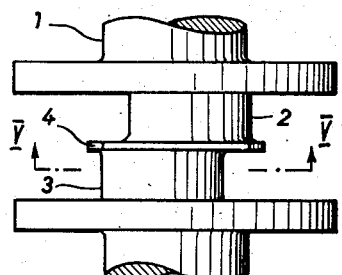
Figure 7:
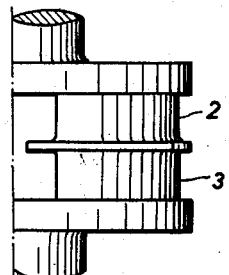

FIGURES 5 to 7 of the drawing show the throw of a crankshaft 1 of an internal combustion engine. The crank pin is axially subdivided in two parts 2 and 3 which are angularly displaced with respect to each other by the correction angle $\varphi_k$. The two parts 2 and 3 are separated from each other by an intermediate cheek 4. This cheek projects in transverse direction beyond the crank pin parts and, apart from mechanically connecting the two parts, it affords a safe guide abutment for the inner lateral faces of the connecting rod heads.

Figure 1:
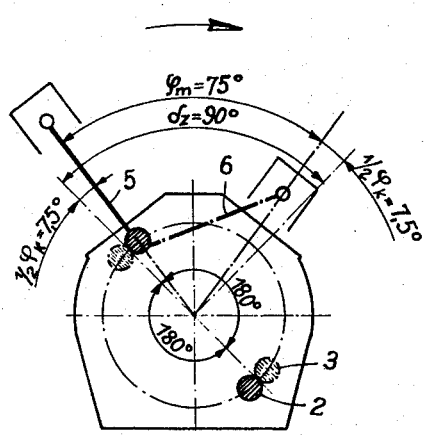
Figure 2:
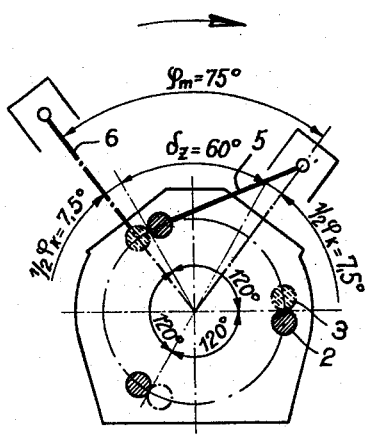

In the two cylinder rows of 8 and 12 cylinders, as diagrammatically illustrated in FIGURES 1 and 2, the correction angle $\varphi_k$ is 15°. In the 8-cylinder engine, the opening angle $\varphi$ is reduced by a negative correction of 15° with respect to the normal ignition angle $\delta_z$ of 90°, while in the 12-cylinder engine the opening angle $\varphi$ is increased by a positive correction of 15° with respect to the normal ignition angle of 60°, to form a common average value of $\varphi_m = 75°$ for the opening angle of both engines. The connecting rods 5 and 6 are alternatively connected to the leading and trailing crank pin parts 2 and 3, as this is illustrated in diagrammatic manner in the drawing.

Figure 3:
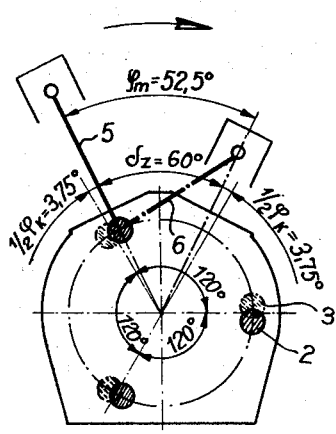
FIGURES 3 and 4 are diagrammatic illustrations of a 12-cyclinder and a 16-cylinder four cycle V-engine, respectively.
Figure 4:
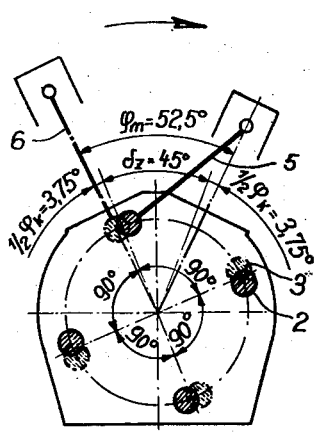

In the arrangement shown in FIGURES 3 and 4, for 12- or 16-cylinder V-engines, the correction angle $\varphi_k$ is 7.5°. Therefore, the opening angle for the 12-cylinder engine is reduced by 7.5°, thus from $\delta_z = 60°$ to $\varphi_m = 52.5°$. For the 16-cylinder engine, on the other hand, the resulting opening angle is increased by 7.5°, namely from $\delta_z = 45°$ to the same average value of $\varphi_m = 52.5°$. Also in this case the heads of the connecting rods are alternately connected to the leading or trailing crank pin portions 2 and 3, respectively. For the sake of clearness the leading pin parts 2 are shown darker than the trailing pin parts 3.

The correction of the opening angle to an average value $\varphi_m$ is not limited to a pair of motor types. It rather can also be extended to three and more types. Frequently a line of 8-, 12- and 16-cylinder V-engines of equal bore are produced, having an average opening angle of $$\varphi_m = \underbrace{90° - 22.5°}_{\text{8 cyl.}} = \underbrace{60° + 7.5°}_{\text{12 cyl.}} = \underbrace{45° + 22.5°}_{\text{16 cyl.}} = 67.5°$$

Often, it is the correction $\varphi_k$ of the opening angle between the cylinder axes for two or more motor types, according to the invention, which alone renders it possible to build V-engines with a regular ignition order, for example in air cooled engines, to ensure the necessary rate of air flow in air cooled motors, and to limit to a minimum the space requirement of the engines. The invention offers the further advantage that the crank cases and thus also various individual parts of the engines may be standardized with respect to production technique and consequently a reduction in manufacturing costs will be obtained. This advantage holds also true for the auxiliary means used in workshops, such as templets and drill gauges; in addition the sides of the auxiliary engines can be constructed so as to be perfectly similar, having standardized casing and other units.

The advantages obtained by the opertaion of engines according to the invention may be summarized as follows:

In 8-cylinder and 12-cylinder V-type engines, in spite of a similar opening angle of 75°, a normal ignition spacing of 60° and 90°, respectively, is obtained for both engines, which fact results into a smoother running performance and a reduced inducement to vibrations of the surroundings. The critical values of the ignition cycle for the individual cylinder rows of the engines are suppressed, i.e. greater speed ranges are obtained without creating conditions for rotary oscillations. The multiple excitation of vibrations due to irregular ignition spacing is eliminated, whereby lower oscillatory stresses of the driving unit and the bearings are obtained. The stress conditions of the crankshaft with respect to bending are more favourable owing to the distribution of the power effect into several planes, so that the excitation frequency in the same plane is reduced to one half of the value or still lower with respect to that of conventional engines. The conventional vibration damper can be simplified or under circumstances it may be eliminated entirely. Injection pumps can be used with a standard camshaft, and it is possible to avoid special pump constructions. Since each connecting rod is associated with a separate crank pin, the lateral guiding of the connecting rods is improved.

Figure 8A:
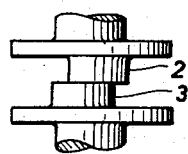
Figure 8B:
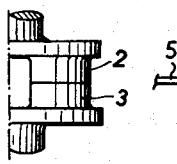
Figure 9A:
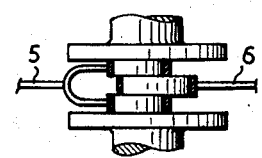
Figure 9B:
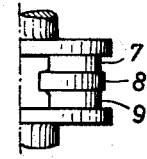

In FIGS. 8a and 8b a manner of subdividing the crank pin is shown for a V-shape engine, in which the arrangement of an intermediate cheek between the portions 2 and 3 is omitted for the sake of simplicity. According to FIGS. 9a and 9b the crank pin is subdivided in three portions 7, 8 and 9 so that both connecting rods 5 and 6 act symmetrically on the pin with respect to the middle transverse plane. The head of the connecting rod 5 is bifurcated and cooperates with the two outer portions 7 and 9 of the pin.

We claim:

1. A multi-cylinder internal combustion engine having two rows of cylinders in a V-arrangement, the number of cylinders being an integral multiple of four, the opening angle between the two rows of cylinders being equal to the average of the theoretically optimum opening angles for a series of engines with integral multiples of four cylinders in a V-arrangement, said engine having a crankshaft with crank throws having axially subdivided crank pin portions, adjacent pin portions being angularly displaced relative to each other by an angle which is equal to the difference between the said average opening angle and the theoretically optimum opening angle for an engine with said number of cylinders in said two rows of cylinders.

2. A multi-cylinder internal combustion engine as claimed in claim 1 in which said average opening is 75°, whereby said engine can have 8 or 12 cylinders.

3. A multi-cylinder internal combustion engine as claimed in claim 1 in which said opening angle is 52.5°, whereby said engine can have 12 or 16 cylinders.

4. A multi-cylinder internal combustion engine as claimed in claim 1 in which said opening angle is 67.5°, whereby said engine can have 8, 12 or 16 cylinders.

5. An internal combustion engine according to claim 1, wherein said two angularly displaced portions of the crank pins have an intermediate cheek arranged between themselves.

6. An internal combustion engine according to claim 5, wherein said intermediate cheek transversely projects beyond the circumference of the crank pin portions to serve as lateral guide for the heads of the connecting rods.

References Cited in the file of this patent

UNITED STATES PATENTS

Re. 15,019     Landgraf _____ Jan. 4, 1921

FOREIGN PATENTS 102,378     Great Britain _____ Mar. 15, 1917